United States Patent [19]

Sato et al.

[11] Patent Number: 5,304,629
[45] Date of Patent: Apr. 19, 1994

[54] PRODUCTION PROCESSES OF ARYLENE THIOETHER OLIGOMER AND COPOLYMER

[75] Inventors: Hiroyuki Sato; Mitsuru Hoshino; Yuichika Kawakami, all of Iwaki, Japan

[73] Assignee: Kureha Kagaku Kogyo K.K., Tokyo, Japan

[21] Appl. No.: 113,472

[22] Filed: Aug. 30, 1993

Related U.S. Application Data

[62] Division of Ser. No. 858,735, Mar. 27, 1992, Pat. No. 5,262,517.

[30] Foreign Application Priority Data

Apr. 9, 1991 [JP] Japan ................... 3-103750

[51] Int. Cl.$^5$ ............................................. C08G 75/14
[52] U.S. Cl. .................................... 528/388; 528/354; 528/356; 528/359; 525/537
[58] Field of Search ............... 528/354, 356, 359, 388; 525/537

[56] References Cited

U.S. PATENT DOCUMENTS

3,919,177  11/1975  Campbell ........................... 528/388
4,645,826   2/1987  Iizuka et al. ....................... 528/388

FOREIGN PATENT DOCUMENTS

0053344  6/1982  European Pat. Off. .
0164638  12/1985  European Pat. Off. .
0459620  12/1991  European Pat. Off. .
2470780  6/1981  France .
2-140233  5/1990  Japan .
4-7334  1/1992  Japan .

OTHER PUBLICATIONS

Lothar Freund et al, Telechelic poly(thio-1,4--phenylene)s and poly(thio-1,4-phenylene)-blockpolyamides, Makromol. Chem. 191 815-828 (1990).
Walter Heitz, Telechele Als Bausteine Fur Neuartige Polymere, Die Angewandte Makromolekulare Chemie 145/146 (1986) 37-68 (2391).
W. Heitz, Block copolymers with LC-Segments, Makromol, Chem., Macromol. Symp. 26, 1-8 (1989).
G. Daccord et al, "α-{Difunctionalized Poly(p-thiophenylene) Oligomers 1.Synthesis and Properties", Polymer Bulletin 4, pp. 459-466 (1981).
G. Daccord et al, "α-{Bifunctional Poly(p-phenylene sulfide) Oligomers 2.Segmented Copolyesters", Polymer Bulletin 6, pp. 477-484 (1982).
Chemical Abstracts, 1986, 105, No. 227349F dated Dec. 29, 1986.

*Primary Examiner*—John C. Bleutge
*Assistant Examiner*—Helen F. Lee
*Attorney, Agent, or Firm*—Lowe, Price, LeBlanc & Becker

[57] ABSTRACT

Disclosed herein are a process for the preparation of a carboxylated arylene thioether oligomer, in which an alkali metal sulfide is caused to act on a poly(arylene thioether) so as to depolymerize the poly(arylene thioether), thereby preparing an alkali thiolate-containing oligomer, and a carboxylating agent is then caused to act on the alkali thiolate-containing oligomer, thereby forming the carboxylated arylene thioether oligomer, and a process for the production of an arylene thioether copolymer, wherein the carboxylated arylene thioether oligomer alone, which has been obtained in accordance with this preparation process, or a mixture of the carboxylated oligomer in an amount of at least 50 wt. % and another carboxylic compound in an amount less than 50 wt. % is reacted with an alkylenediol or an alkylenediol and a polyester or an alkylene diol and a lactone.

5 Claims, No Drawings

PRODUCTION PROCESSES OF ARYLENE THIOETHER OLIGOMER AND COPOLYMER

This application is a division of application Ser. No. 07/858,735 filed on Mar. 27, 1992, now U.S. Pat. No. 5,262,517.

FIELD OF THE INVENTION

This invention relates to a novel process for the preparation of carboxylated arylene thioether oligomers. This invention is also concerned with a process for the production of arylene thioether copolymers containing thioether linkages and ester linkages in its principal chain by using, as a carboxylic acid component, such a carboxylated arylene thioether oligomer.

BACKGROUND OF THE INVENTION

Poly(arylene thioether) (hereinafter abbreviated as "PATE") represented by poly(p-phenylene sulfide) is known as a polymer having a high crystalline melting point and excellent heat resistance, solvent resistance and mechanical properties.

However, PATE is restricted in its application to uses for which flexibility is required due to its high crystalline melting point and glass transition temperature, or has a drawback to its development into fields used as a solution due to its high solvent resistance. It has therefore been desired to improve the above-described problems while retaining the good heat resistance of PATE.

The present inventors carried out an investigation with a view toward providing improved arylene thioether copolymers by copolymerizing with an arylene thioether component, which is a constituent for PATE, another component.

The present inventors previously found that when an alkali metal sulfide is caused to act on PATE in a polar solvent, the principal chain of PATE is cut to depolymerize PATE, whereby a compound having at least one alkali thiolate group can be obtained (Japanese Patent Application Laid-Open No. 7334/1992 and U.S. patent application Ser. No. 07/686,972). The average polymerization degree of the compound obtained by this depolymerization process can be adjusted to any level ranging from oligomers to polymers relatively high in molecular weight, and the compound can be expected to use as a raw material for various syntheses because it has at least one alkali thiolate group as an active group. In addition, it is expectable to provide a copolymer having a uniform composition when using an oligomer (average polymerization degree: about 50 or lower) obtained by this depolymerization process as a copolymerizable component with other components because the molecular weight distribution of the oligomer is relatively even.

In Japanese Patent Application Laid-Open No. 140233/1990, there is disclosed a process in which a poly(phenylene sulfide) is reacted with an alkali metal sulfide at 150°-230° C. in a polar aprotic solvent, thereby producing a poly(phenylene sulfide) having a thiolate or thiol group on at least one terminal thereof. However, this polymer is not a polymer obtained by depolymerization, and is used for forming a block or a graft copolymer which serves as a compatibilizer by melting and mixing it with various kinds of polymers.

In Makromol. Chem., Macromol. Symp., 26, 1-8 (1989) and Makromol. Chem., 191, 815-828 (1990), there is disclosed a process in which p-dichlorobenzene is reacted with an excess amount of sodium sulfide to obtain a polymer having an alkali thiolate group on at least one terminal thereof and the thus-obtained polymer is further reacted with p-chlorobenzoic acid, thereby producing a carboxylic acid containing polymer. Further, in Polymer Bulletin, 4, 459-466 (1981) and Die Angewandte Makromolekulare Chemie, 145/146, 37-68 (1986), there is disclosed carboxylic acid containing p-phenylene thioether oligomers. Furthermore, France Patent No. 2,470,780 and Polymer Bulletin, 6, 477-484 (1982) disclose a process for the production of copolymers by reacting a carboxylic acid containing p-phenylene thioether oligomer with a diol. None of these references disclose a production process of copolymers by using an oligomer having at least one alkali thiolate, which is obtained by causing an alkali metal sulfide to act on PATE to depolymerize PATE.

OBJECTS AND SUMMARY OF THE INVENTION

An object of this invention is to provide a novel process for the preparation of carboxylated arylene thioether oligomers.

Another object of this invention is to provide a process for the production of arylene thioether copolymers containing thioether linkages and ester linkages in its principal chain and having improved flexibility and solubility in solvents by using, as a carboxylic acid component, such a carboxylated arylene thioether oligomer.

The present inventors have carried out an extensive investigation. As a result, it has been found that a carboxylated arylene thioether oligomer can be obtained by causing an alkali metal sulfide to act on a poly(arylene thioether) to depolymerize the poly(arylene thioether), thereby forming an oligomer having at least one alkali thiolate group, and then causing a carboxylating agent to act on the resulting oligomer.

It has also been found that when this carboxylated oligomer is reacted with (1) an alkylenediol, (2) an alkylenediol and a polyester or (3) an alkylenediol and a lactone, their corresponding copolymers excellent in flexibility, solubility in solvents, mechanical properties, processability and the like can be obtained.

The present invention has been brought to completion on the basis of these findings.

According to the present invention, there is thus provided a process for the preparation of a carboxylated arylene thioether oligomer, which comprises the following at least two steps:

(1) the first step comprising causing an alkali metal sulfide to act on a poly(arylene thioether) having recurring units represented by the general formula [I]:

wherein Ar means an arylene group, in a water-containing polar organic solvent so as to depolymerize the poly(arylene thioether), thereby preparing an oligomer having at least one alkali thiolate group; and (2) the second step comprising causing a carboxylating agent represented by the general formula [II]:

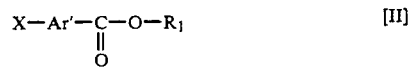

wherein X means a halogen atom, $R_1$ denotes a hydrogen atom, an alkyl group having 1–4 carbon atoms, an aryl group or an alkali metal atom, and Ar′ is an arylene group, to act on the alkali thiolate-containing oligomer obtained in the first step, thereby forming the carboxylated arylene thioether oligomer.

According to this invention, there is also provided a process for the production of an arylene thioether copolymer, which comprises reacting (A) the carboxylated arylene thioether oligomer alone, which has been obtained in accordance with the preparation process as described above, or a mixture of the carboxylated oligomer in an amount of at least 50 wt. % and another carboxylic compound in an amount less than 50 wt. % with (B) an alkylenediol.

According to this invention, there is further provided a process for the production of an arylene thioether copolymer, which comprises reacting (A) the carboxylated arylene thioether oligomer alone, which has been obtained in accordance with the preparation process as described above, or a mixture of the carboxylated oligomer in an amount of at least 50 wt. % and another carboxylic compound in an amount less than 50 wt. % with (B) an alkylenediol and (C) a polyester.

According to this invention, there is still further provided a process for the production of an arylene thioether copolymer, which comprises reacting (A) the carboxylated arylene thioether oligomer alone, which has been obtained in accordance with the preparation process as described above, or a mixture of the carboxylated oligomer in an amount of at least 50 wt. % and another carboxylic compound in an amount less than 50 wt. % with (B) an alkylenediol and (D) a lactone.

DETAILED DESCRIPTION OF THE INVENTION

Preparation Process of Arylene Thioether Oligomer

The process for the preparation of the carboxylated arylene thioether oligomer according to the present invention comprises the following at least two steps:

(1) the first step comprising causing an alkali metal sulfide to act on a poly(arylene thioether) so as to depolymerize the poly(arylene thioether), thereby preparing an oligomer having at least one alkali thiolate group; and (2) the second step comprising causing a carboxylating agent to act on the alkali thiolate-containing oligomer obtained in the first step, thereby forming the carboxylated arylene thioether oligomer.

These steps will hereinafter be described.

(1) First Step:

The alkali thiolate-containing oligomer can be obtained by causing an alkali metal sulfide to act on a PATE having recurring units represented by the general formula [I] so as to depolymerize the PATE.

(1) PATE:

PATEs useful as a raw material in this invention have predominant recurring units represented by the general formula [I] and include those ranging from polymers of high polymerization degrees to oligomers of low polymerization degrees, which contain about several recurring units through about several tens recurring units.

Ar in the recurring unit is an arylene group which means a residue with two hydrogen atoms removed from benzene. Those having one or more substituent groups on its nucleus are included therein.

As examples of preferred arylene groups, may be mentioned

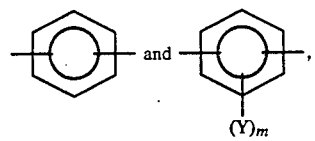

wherein Y means at least one substituent selected from the group consisting of an alkyl group having 1–6 carbon atoms, an alkoxy group having 1–6 carbon atoms, a phenyl group, a cyano group and a halogen atom, and m stands for an integer of 1–4.

The recurring units represented by the general formula [I] are generally contained in a proportion of at least 70 wt. %, preferably at least 80 wt. %, most preferably at least 90 wt. % in the PATE used in this invention. When the content of the recurring units is less than 70 wt. %, there is a potential problem that the heat resistance of the resulting copolymer is impaired. Any contents less than 70 wt. % are therefore not preferred.

As exemplary units constituting minor components other than the recurring units represented by the general formula [I], may be mentioned diphenyl sulfide units, diphenylketone sulfide units, diphenyl ether sulfide units and the like.

As preferred PATES, may be mentioned poly(p-phenylene sulfide), poly(p-phenylene sulfide) with poly(m-phenylene sulfide) contained as a minor component therein, and the like.

PATEs useful in the practice of this invention, as disclosed in, for example, U.S. Pat. Nos. 3,919,177 and 4,645,826, can be obtained by polymerizing under heating an alkali metal sulfide and a dihalogen-substituted aromatic compound in the presence of water in a polar organic solvent such as N-methylpyrrolidone. It is also permissible to use a PATE, which has a partially cross-linked and/or branched structure and has been obtained by adding a small amount of a polyhalobenzene such as trichlorobenzene upon polymerization to copolymerize it. Although the PATE thus obtained may be used in the form isolated from the reaction mixture, the reaction mixture may be provided as a partial component for depolymerization as it is.

(2) Polar organic solvent:

As the polar organic solvent, aprotic organic amide solvents typified by N-alkylpyrrolidones such as N-methylpyrrolidone, 1,3-dialkyl-2-imidazolidinones, tetraalkylureas, hexaalkylphosphoric triamides and the like are preferred because they have high stability in the reaction system.

(3) Alkali metal sulfide:

As preferred examples of the alkali metal sulfide used in the depolymerization of the PATE, may be mentioned lithium sulfide, sodium sulfide, potassium sulfide, rubidium sulfide, cesium sulfide and mixtures thereof.

These alkali metal sulfides can be used as hydrates or aqueous mixtures, or in anhydrous forms. In addition, an alkali metal sulfide prepared in situ from an alkali hydrosulfide and an alkali metal hydroxide in a reaction system may also be used.

(4) Alkali thiolate-containing oligomer:

It is believed that the oligomer obtained by causing an alkali metal sulfide to act on a PATE to depolymerize the PATE contains at least one alkali thiolate group in its molecule and consists principally of a compound represented by the following general formula [III]:

wherein M means an alkali metal atom, Ar denotes an arylene group, and n stands for a number ranging from 3 to 50.

Here, n is a number of recurring units and preferably falls in a range of 3–50, preferably 3.5–40 upon the production of copolymers according to the present invention. If n exceeds 50, the flexibility, solubility in solvents and the like of the resulting copolymer are not sufficiently improved. On the other hand, any numbers smaller than 3 result in a copolymer impaired in heat resistance.

The preparation process of the alkali thiolate-containing oligomer will hereinafter be described specifically. This oligomer can suitably be obtained by subjecting a mixture comprising:

(A) a polar organic solvent containing water in a proportion of 0.1–10 moles per kg of the polar organic solvent;

(B) a PATE in a proportion of 0.1–5 basal moles per kg of the polar organic solvent; and (C) an alkali metal sulfide in a proportion of 0.02–0.5 mole per basal mole of the PATE, to a depolymerization reaction.

The term "basal mole" as used herein means the number of moles, which has been calculated supposing the sum of atomic weights of atoms constituting the recurring unit represented by the general formula [I] is 1 gram molecule.

The reaction is generally conducted at 230°–300° C., preferably 235°–290° C., most preferably 240°–280° C. Any reaction temperatures lower than 230° C. result in insufficient depolymerization and formation of alkali thiolate group, and require too long reaction time. On the other hand, if the temperature is higher than 300° C., undesirable side reaction tends to occur. Reaction temperatures outside the above range are therefore not preferred.

The reaction is generally conducted for 0.2–30 hours, preferably 0.5–20 hours. Any reaction time shorter than 0.2 hour involves a potential problem of insufficient reaction. To the contrary, any time longer than 30 hours involves an economical disadvantage.

The water content in the first step is generally within a range of 0.1–10 moles, preferably 0.2–7 moles per kg of the polar organic solvent. Any water contents less than 0.1 mole involve a potential problem that the solubility of the alkali metal sulfide becomes insufficient. On the other hand, any water contents more than 10 moles are accompanied by a potential problem that depolymerization and formation of alkali thiolate group become insufficient and/or an undesirable side reaction occurs.

The amount of the PATE used in the depolymerization is generally within a range of 0.1–5 basal moles, preferably 0.2–4 basal moles per kg of the polar organic solvent. Any amounts less than 0.1 basal mole result in reduction in productivity and hence involve an economical disadvantage. To the contrary, any amounts more than 5 basal moles result in viscosity increase in the course of reaction. Amounts outside the above range are hence not preferred.

The amount of the alkali metal sulfide is generally within a range of 0.02–0.5 mole, preferably 0.025–0.3 mole, most preferably 0.03–0.2 mole per basal mole of the PATE. Any amounts less than 0.02 mole involve a potential problem that the formation of alkali thiolate group becomes insufficient. To the contrary, any amounts exceeding 0.5 mole are too much to react fully. Amounts outside the above range are hence not preferred.

The mixture containing the water-containing polar organic solvent, PATE and alkali metal sulfide is desirably alkaline such that the pH of an aqueous solution obtained by diluting the mixture with water in an amount 100 times the weight of the mixture is 9 or higher, preferably 10 or higher, most preferably 11 or higher. Any pH lower than 9 involves a potential problem that the depolymerization and formation of alkali thiolate group become insufficient and at the same time, a decomposition reaction occurs.

In order to alkalify the mixture to a desired extent, a basic compound may be added in a proportion of, generally 0.001–1 mole, preferably 0.005–1 mole per basal mole of the PATE.

As such a basic compound, may be mentioned at least one compound selected from the hydroxides, oxides and carbonates of alkali metals or alkaline earth metals.

The alkali thiolate-containing oligomer may be used as a component in the subsequent second step to form the carboxylated arylene thioether oligomer as it is in the form of a (liquid) reaction mixture containing the same. In this case, the polar organic solvent and water, both, contained in the reaction mixture may be used in the second step as they are. It is also possible to separate once the alkali thiolate-containing oligomer from the reaction mixture under non-oxidizing conditions and then use it as a component in the second step.

(2) Second Step:

The carboxylated arylene thioether oligomer is obtained by causing a carboxylating agent represented by the general formula [II] to act on the alkali thiolate-containing oligomer obtained in the first step.

(1) Carboxylating agent:

In this invention, a compound represented by the general formula [II] is used as the carboxylating agent.

Ar' in the general formula [II] means the same arylene group as Ar defined in the general formula [I]. The aryl group of $R_1$ is a residue with one hydrogen atom removed from benzene. Those having one or more substituent groups on its nucleus are included therein.

As examples of such a compound, may be mentioned benzoic acids such as o-chlorobenzoic acid, m-chlorobenzoic acid, p-chlorobenzoic acid, o-bromobenzoic acid, m-bromobenzoic acid and p-bromobenzoic acid; benzoic esters such as methyl m-chlorobenzoate, methyl p-chlorobenzoate, ethyl p-chlorobenzoate and phenyl p-chlorobenzoate; alkali metal benzoates such as sodium p-chlorobenzoate and sodium p-bromobenzoate; and the like. Of these, p-chlorobenzoic acid, sodium p-chlorobenzoate, methyl p-chlorobenzoate and the like are preferred from the viewpoint of availability.

(2) Carboxylated arylene thioether oligomer:

It is believed that the carboxylated arylene thioether oligomer contains at least one carboxyl group and/or at least one ester group in its molecule and consists principally of a compound represented by the following general formula [IV]:

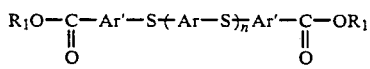

wherein $R_1$ means a hydrogen atom, an alkyl group having 1–4 carbon atoms, an aryl group or an alkali metal atom, Ar and Ar' denote individually an arylene group and may be equal to or different from each other, and n stands for a number of 3–50.

The carboxylated arylene thioether oligomer obtained in accordance with this invention features that its molecular weight distribution (weight-average molecular weight/number-average molecular weight) as determined by gel permeation chromatography (GPC) falls within a narrow range of, generally 1.5–3.5, preferably 1.8–3.0 because an alkali thiolate-containing compound obtained by causing an alkali metal sulfide to act on a PATE to depolymerize the PATE is used as a starting material. Therefore, the use of this oligomer for the production of copolymers permits easy control of conditions for production and the easy provision of copolymers uniform in composition distribution.

A specific process for the preparation of the carboxylated arylene thioether oligomer includes a process in which the carboxylating agent is caused to act on the alkali thiolate-containing oligomer in a proportion of 2–20 moles per mole of the alkali thiolate-containing oligomer in an organic solvent so as to eliminate an alkali metal halide.

The reaction is generally conducted at 50°–300° C., preferably 100°–280° C., most preferably 200°–260° C. If the temperature is higher than 300° C., there is a potential problem that decomposition occurs due to an undesirable side reaction. On the other hand, any reaction temperatures lower than 50° C. result in insufficient reaction.

The reaction is generally conducted for 0.1–20 hours, preferably 0.2–15 hours, most preferably 0.5–10 hours. Any reaction time longer than 20 hours is not preferred from the viewpoint of productivity. Any reaction time shorter than 0.1 hour is also not preferred due to a potential problem of insufficient reaction.

The amount of the carboxylating agent is generally within a range of 2–20 moles, preferably 2.1–10 moles, most preferably 2.2–5 moles per mole of the alkali thiolate-containing oligomer. Any amounts less than 2 moles make it difficult to form a carboxylated arylene thioether oligomer. To the contrary, any amounts exceeding 20 moles involve an economical disadvantage.

The number of moles of the alkali thiolate-containing oligomer in this invention is defined as the number of moles of the alkali metal sulfide, which has been determined by subtracting the amount of the remaining alkali metal sulfide after the depolymerization reaction from the amount of the alkali metal sulfide added upon the preparation of this oligomer.

Preferred examples of the organic solvent suitable for use in the reaction of the alkali thiolate-containing oligomer with the carboxylating agent may include polar solvents such as amide compounds, lactam compounds, urea compounds and cyclic organophosphorus compounds; and the polar organic solvents used in the first step to prepare the alkali thiolate-containing oligomer. As specific examples of such solvents, may be mentioned N,N-dimethylacetoamide, N,N-dimethylformamide, N-methylpyrrolidone, 1,3-dimethylimidazolidinone, N-methyl-ε-caprolactam, tetrmethylurea and mixtures thereof. Polar organic solvents such as N-methylpyrrolidone and 1,3-dimethylimidazolidinone are particularly preferred because they can be used subsequently to the first step.

It is a preferred reaction form to use the reaction mixture containing the alkali thiolate-containing oligomer, which has been prepared in the first step, in the second step as it is so as to use the polar organic solvent contained in this reaction mixture as a full or partial organic solvent for the preparation of the carboxylated arylene thioether oligomer together with other components contained in the reaction mixture, for example, water, the alkali metal sulfide and/or the basic compound.

The organic solvent used in the second step may contain water. The reaction may preferably be conducted under conditions that water exists in a range of up to 15 moles, preferably up to 10 moles per kg of the organic solvent.

The proportion of the alkali thiolate-containing oligomer to the organic solvent is generally within a range of 0.001–5 moles, preferably 0.01–2 moles per kg of the organic solvent. Any proportions lower than 0.001 mole result in reduction in productivity and hence involve an economical disadvantage. To the contrary, any amounts exceeding 5 moles result in a reaction mixture high in viscosity. Any amounts outside the above range are hence not preferred.

Upon the formation of the carboxylated arylene thioether oligomer by the reaction of the alkali thiolate-containing oligomer with the carboxylating agent, the mixture containing them must be alkaline such that the pH of an aqueous solution obtained by diluting the mixture with water in an amount 100 times the weight of the mixture is 9 or higher, preferably 10 or higher, most preferably 11 or higher. Any pH lower than 9 involves a potential problem that an undesirable side reaction occurs. In order to alkalify the mixture to a desired extent, the mixture desirably contains the same basic compound as described in the first step in a range of 0.001–21 moles, preferably 0.01–15 moles, most preferably 0.02–10 moles per mole of the alkali thiolate-containing oligomer.

Other components such as an alkali metal sulfide and water may suitably be used in this mixture within limits unprejudicial to the objects of this invention, as needed.

The carboxylated arylene thioether oligomer obtained in the second step is generally provided in the form of a (liquid) reaction mixture containing the oligomer, organic solvent and the like. The thus-obtained carboxylated oligomer does not require to be in the form of the reaction mixture when used in the subsequent copolymerization step. The oligomer is separated once from the reaction mixture containing same to use as a part of reaction components in the copolymerization step.

The carboxylated arylene thioether oligomer may be suitably separated from the reaction mixture using the conventional separation method, for example, filtration or centrifugation.

Production Process of Arylene Thioether Copolymer

The copolymerization step to produce the arylene thioether copolymer in this invention corresponds to the third step subsequent to the first and second steps in which the carboxylated arylene thioether oligomer is formed.

The arylene thioether copolymer containing thioether linkages and ester linkages in its principal chain can be produced in accordance with a process in which the carboxylated arylene thioether oligomer alone, which has been obtained in the second step as described above, or a mixture of the carboxylated oligomer in an amount of at least 50 wt. % and another carboxylic compound in an amount less than 50 wt. % is reacted with any one of the following components:

(1) an alkylenediol;
(2) an alkylenediol and a polyester; and
(3) an alkylenediol and a lactone.

The production process of the arylene thioether copolymer will hereinafter be described in detail.

Starting Materials (1) Carboxylated arylene thioether oligomer alone, or a mixture of the carboxylated oligomer in an amount of at least 50 wt. % and another carboxylic compound in an amount less than 50 wt. % (Carboxylic acid component):

In this invention, the carboxylated arylene thioether oligomer or its mixture with another carboxylic compound is used as one component (carboxylic acid component) for the formation of a copolymer.

As examples of the another carboxylic acid component, may be mentioned aliphatic dicarboxylic acids such as oxalic acid and adipic acid; alicyclic dicarboxylic acids such as 1,4-cyclohexanedicarboxylic acid and decahydro-2,6-naphthalenedicarboxylic acid; aromatic dicarboxylic acids such as terephthalic acid and 2,6-naphthalenedicarboxylic acid; and lower alkyl esters such as methyl and ethyl esters, aryl esters such as phenyl esters and acid chlorides of these carboxylic acids.

In the case where the mixture of the carboxylated arylene thioether oligomer with another carboxylic compound is used, it is important upon the practice of this invention to contain the oligomer in a proportion of at least 50 wt. %, preferably at least 70 wt. %, most preferably of 90 wt. % in the mixture. Any amounts less than 50 wt. % involve a potential problem that the heat resistance of the resulting copolymer is impaired. It is hence not preferred to use the oligomer in such a small amount.

(2) Alkylenediol:

The alkylenediol is a component suitable for use in reacting with the carboxylic acid component to obtain an arylene thioether copolymer.

Alkylenediols having an average molecular weight of 5,000 or lower and/or esters thereof are preferred from the viewpoint of the flexibility, solubility in solvents and the like of the resulting copolymer. Any alkylenediols having an average molecular weight higher than 5,000 are not preferred because they have lowered reactivity with the carboxylated arylene thioether oligomer.

As exemplary alkylenediols, may be mentioned lower alkylenediols having an average molecular weight of about 60–200 such as ethylene glycol, 1,3-propanediol, 1,3-butanediol, 1,4-butanediol, 1,6-hexanediol and 1,10-decanediol; polyolefin diols such as polyethylenediol, and hydrogenated products of polyisoprenediol and polybutadienediol; and monoesters and diesters of these diols with a carboxylic acid such as formic acid or acetic acid. These alkylenediols may be used either singly or in combination.

Ethylene glycol and 1,4-butanediol, and polyethylenediol are particularly preferred in that the resulting copolymer is improved in solubility in solvents and that the copolymer is enhanced in flexibility, respectively.

(3) Alkylenediol and polyester:

The alkylenediol and polyester are another component suitable for use in reacting with the carboxylic acid component to obtain an arylene thioether copolymer.

The polyester useful in the practice of this invention is a polymer or copolymer containing ester linkages or ester linkages and ether linkages in its principal chain and having an aromatic ring such as a benzene ring or naphthalene ring in its recurring unit and an average molecular weight of at least 500. Any polyesters having an average molecular weight lower than 500 make it difficult to heighten the polymerization degree of the resulting copolymer. It is thus not preferred to use such polyesters.

As exemplary polyesters, may be mentioned aromatic polyesters typified by polymers such as polyethylene terephthalate, polytetramethylene terephthalate and polyhexamethylene terephthalate and copolymers obtained by combining two or more of these monomers; copolymers of these aromatic polyesters with an aliphatic polyether; copolymers of these aromatic polyesters with an aliphatic polyester; and mixtures thereof. Of these, copolymers of an aromatic polyester with an aliphatic polyether and copolymers of an aromatic polyester with an aliphatic polyester are preferred because the resulting arylene thioether copolymers according to this invention are improved in flexibility and solubility in solvents.

In this case, the alkylenediol is used to smoothly advance the reaction by which the arylene thioether copolymer of this invention is obtained. The above-mentioned alkylenediols may be used with the lower alkylenediols being preferred.

(4) Alkylenediol and lactone:

The alkylenediol and lactone are a further component suitable for use in reacting with the carboxylic acid component to obtain an arylene thioether copolymer.

As exemplary lactones, may be mentioned β-butyrolactone, δ-valerolactone, δ-caprolactone, ε-caprolactone and mixtures thereof. Of these, ε-caprolactone and δ-valerolactone are preferred from the viewpoint of availability and reactivity.

Examples of the alkylenediol are as described above with the lower alkylenediols being particularly preferred.

The thus-obtained arylene thioether copolymers become improved in flexibility and solubility in solvents.

Production Process

Production Process 1

Production process of copolymers in which a carboxylic acid component containing a carboxylated arylene thioether oligomer is reacted with an alkylenediol:

A copolymer containing thioether linkages and ester linkage in its principal chain can be obtained by reacting a carboxylic acid component and an alkylenediol in a proportion of 0.1–5 moles per mole of the carboxylic acid component with each other in the presence of a catalyst at 150°–350° C. for 0.2–30 hours.

In the case where a lower alkylenediol, which can be distilled off in the course of the reaction, is used as the alkylenediol component, it is desirable to use same in a range of, generally 0.9–5 moles, preferably 1.0–3 moles per mole of the carboxylic acid component. On the other hand, in the case where the alkylenediol component is a polyolefin diol difficult to be distilled off, it is desirable to use same in a range of, generally 0.9-1.1 moles, preferably 0.95-1.05 moles per mole of the carboxylic acid component.

In the case where the lower alkylenediol and polyolefin diol are used in combination as the alkylenediol component, it is favorable to control their amounts in such a manner that the polyolefin diol is contained in an amount of 0.1-1.1 moles, preferably 0.2-1.0 mole, and the whole amount of the alkylenediols falls within a range of 0.9-5 moles, preferably 1.0-3 moles. Any proportions of the alkylenediol component exceeding 5 moles are not preferred from the viewpoint of economical efficiency. To the contrary, the use of the alkylenediol component in any proportions lower than 0.9 mole results in a copolymer low in polymerization degree.

Catalysts usable in the production of polyester can be used as a catalyst in this production process. As preferred examples of these catalysts, may be mentioned titanium catalysts, antimony catalysts, tin catalysts, germanium catalysts and mixtures thereof. The amount of the catalyst to be used generally ranges from 0.005 to 0.5 wt. % based on the total weight of the carboxylic acid component and alkylenediol component.

The temperature of the reaction must be controlled to a temperature higher than the melting point of the resulting copolymer, and is generally within a range of 100°-350° C., preferably 150°-320° C. Any reaction temperatures lower than 100° C. result in an uneven reaction system and make the reaction rate slow. To the contrary, any temperatures exceeding 350° C. are accompanied by a potential problem of decomposition.

The reaction time is generally within a range of 0.2-50 hours, preferably 0.5-30 hours. Any reaction time exceeding 50 hours involves an economical disadvantage. On the other hand, any time shorter than 0.2 hour results in an insufficient reaction.

As necessary, the copolymer produced in the above-described manner can be heated at a temperature range not lower than 100° C. but lower than the melting point of the copolymer to heighten its degree of polymerization.

The copolymers according to this invention can suitably be obtained by properly adopting the reaction conditions generally used in the production of polyesters, for example, a reaction in an atmosphere of inert gas such as nitrogen and argon, a reaction under reduced pressure or a reaction in the presence of no solvent.

Production Process 2

Production process of copolymers in which a carboxylic acid component containing a carboxylated arylene thioether oligomer is reacted with an alkylenediol and a polyester:

A copolymer containing thioether linkages and ester linkage in its principal chain can be obtained by reacting a carboxylic acid component and a polyester at a weight ratio of 20:80-90:10 and an alkylenediol in a proportion of 0.1-5 moles per mole of the carboxylic acid component with one another in the presence of a catalyst at 100°-350° C. for 0.2-50 hours.

Any weight ratios of the carboxylic acid component to the polyester outside the range of 20:80-90:10 make it difficult to obtain a copolymer improved in flexibility and solubility in solvents while retaining its good heat resistance. The weight ratio of both components is preferably within a range of 30:70-80:20.

The amount of the alkylenediol component to be used is preferably within a range of 0.1-1 mole for the polyolefin diol or of 0.1-5 moles for the lower alkylenediol, each, per mole of the carboxylic acid component. In the case where the polyolefin diol and lower alkylenediol are used in combination, it is favorable to control their amounts in such a manner that the polyolefin diol is contained in a range of 0.1-1 mole, and the whole amount of the alkylenediols falls within a range of 0.1-5 moles. In order to favorably practice the present invention, it is desirable to use a lower alkylenediol as an alkylenediol component. In this case, its amount preferably falls within a range of 0.3-3 moles.

The use of the alkylenediol component in any proportions lower than 0.1 mole makes it difficult to heighten the polymerization degree of the resulting copolymer. On the other hand, any proportions exceeding 5 moles increase the amount of liquid matter distilled out in the course of the reaction and make the reaction time longer, and hence involve a disadvantage.

The catalyst, polymerization temperature, polymerization time and the like are the same as those described in Production Process 1.

Production Process 3

Production process of copolymers in which a carboxylic acid component containing a carboxylated arylene thioether oligomer is reacted with an alkylenediol and a lactone:

In this production process, a prepolymer is firs of all formed by reacting a carboxylic acid component with an alkylenediol in accordance with Production Process 1. Thereafter, the prepolymer and a lactone are reacted with each other at a weight ratio of 20:80-80:20 at 100°-350° C. for 0.2-50 hours to produce a copolymer. According to this production process, a copolymer containing thioether linkages and ester linkage in its principal chain can be produced.

The prepolymer used in this production process is preferably that obtained by using a lower alkylenediol as an alkylenediol component.

It is preferable upon the production of copolymers to use the prepolymer and lactone at a weight ratio ranging from 20:80 to 80:20, preferably from 30:70 to 70:30. Any weight ratios outside the range of 20:80-80:20 result in a copolymer deteriorated in flexibility and solubility in solvents, and are hence not preferred.

Although a catalyst may not be used in the reaction of the prepolymer with the lactone, the use of the catalyst can facilitate the reaction. As such a catalyst, may be used those generally used in the polymerization of lactones. Examples of preferred catalysts include metal chelate catalysts, metal acylate catalyst, organic acid salts of lead and manganese, dibutyltin dichloride and the like. The amount of the catalyst to be used is generally within a range up to 0.2 wt. %, preferably up to 0.1 wt. % based on the weight of the prepolymer.

The polymerization temperature, polymerization time and the like are the same as those described in Production Process 1.

Copolymer

The arylene thioether copolymers produced in accordance with the above-described Production Processes 1-3 are believed to have predominant recurring units of the following general formula [V]:

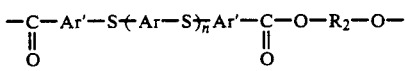

In the general formula [V], $R_2$ means a residue of an organic compound, which has 2 or more carbon atoms and is determined according to another component reacted with the carboxylic acid component in the Production Processes 1-3. Ar and Ar' are as defined in the general formula [IV].

ADVANTAGES OF THE INVENTION

According to this invention, there is provided a preparation process of carboxylated arylene thioether oligomers.

According to this invention, there is also provided a novel production process of copolymers containing thioether linkages and ester linkages in its principal chain.

The carboxylated arylene thioether oligomers can be used as one starting material for the provision of the arylene thioether copolymers.

The arylene thioether copolymers obtained in accordance with the production process of this invention can be used as resins excellent in flexibility, solubility in solvents, mechanical strength, processability and the like in a wide variety of application fields, for example, as injection-molded products, extruded products, etc.

EMBODIMENTS OF THE INVENTION

The present invention will hereinafter be described specifically by the following examples, referential examples and comparative examples.

Incidentally, the following methods were followed for the measurement of the physical properties of oligomers and polymers in the following examples.

(1) Melting point (Tm) and glass transition temperature (Tg):

The melting point and glass transition temperature of each oligomer or polymer sample were measured in the following manner. Powder as polymerized for the oligomer sample, or a sheet 0.5 mm thick, which has been formed by hot-pressing the polymer at 200°–350° C. and then quenching the polymer thus hot-pressed, for the polymer sample was heated by a differential scanning calorimeter (DSC, manufactured by Mettler Instrument AG) at a rate of 10° C./min from room temperature or below 0° C. in a nitrogen atmosphere so as to measure its melting point and glass transition temperature. Incidentally, if a plurality of endothermic peaks appeared upon the melting of crystals, the temperature corresponding to a principal peak was regarded as its melting point.

(2) Melt viscosity:

The viscosity of each sample at a temperature higher than its melting point measured by the DSC by 20° C. was measured as a melt viscosity by a visco-elastometer ("DYNAMIC SPECTROMETER", manufactured by RHEOMETRICS Co.) at a frequency of 10 rad/sec and a strain of 10%.

(3) Number-average molecular weight and molecular weight distribution:

The number-average molecular weight and molecular weight distribution of each oligomer sample were determined by the GPC method. Measuring conditions are as follows:

Column: SHODEX AT 80M/S, two columns in series
Solvent: α-chloronaphthalene
Flow rate: 0.7 ml/min
Temperature: 220° C.
Sample concentration: 0.05 wt. %
Charged amount: 200 μl
Detector: flame ionization detector (FID)
Calibration of molecular weight: standard poly(styrene) and

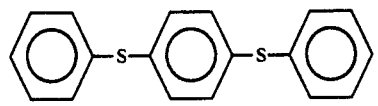

Data processing: SIC 7000B (manufactured by System Instrument Co.)

(4) Structure of oligomer:

The structure of each oligomer sample was judged from the elemental analysis data as to oxygen.

REFERENTIAL EXAMPLE 1

Preparation of PATE

A titanium-lined autoclave was charged with 7.0 kg of N-methylpyrrolidone (hereinafter abbreviated as "NMP") and 3.03 kg (18.0 moles) of hydrated sodium sulfide (water content: 53.6 wt. %). After the autoclave being purged with nitrogen gas, 2.02 kg of an NMP solution, which contained 1.32 kg of water, and 0.41 mole of hydrogen sulfide were distilled off while gradually heating the contents to 200° C.

Thereafter, a liquid mixture consisting of 2.65 kg (18.0 moles) of p-dichlorobenzene, 0.24 kg (13.3 moles) of water and 3.70 kg of NMP was fed to react the contents at 220° C. for 5 hours. Then, 0.72 kg (40.0 moles) of water was additionally introduced under pressure in the autoclave. The contents were heated to 255° C. to react them for 3 hours.

The resultant reaction mixture was sifted by a screen to separate the resulting polymer. The polymer was washed three times with acetone and further three times with water, and then dewatered and dried at 100° C., thereby obtaining a polymer [PATE-(1)] as white granules.

PATE-(1) thus obtained had a melt viscosity of 3,700 poises (at 301° C.), a melting point of 281° C. and a glass transition temperature of 86° C.

EXAMPLE 1

Preparation of Carboxylated Arylene Thioether Oligomer

In a titanium-lined autoclave, a mixture consisting of 972 g (9.00 basal moles) of PATE-(1) prepared in Referential Example 1, 9600 g of NMP, 302 g (1.80 moles) of hydrated sodium sulfide (water content: 53.6 wt. %), 37.2 g (0.930 mole) of sodium hydroxide, 18.6 g (0.251 mole) of calcium hydroxide and 184 g (10.2 moles) of water was stirred at room temperature to prepare a liquid mixture. The pH of an aqueous solution obtained by diluting a portion of the liquid mixture with water in an amount 100 times the weight of the mixture was 11.6.

The liquid mixture was heated at 250° C. for 2 hours while stirring it in a nitrogen gas atmosphere, thereby depolymerizing PATE-(1) into an alkali thiolate-containing oligomer.

A small amount of the liquid mixture was sampled out to determine the amount of $S^{2-}$ in the mixture by ion chromatography. As a result, it was found that the amount of unreacted sodium sulfide remaining in the liquid mixture was 7.6 wt. % of the charged amount.

The thus-obtained liquid reaction mixture (containing 1.66 moles of a sodium thiolate-containing oligomer and 0.14 mole of sodium sulfide) was added with 936 g (5.96 moles) of p-chlorobenzoic acid, 342 g (8.55 moles) of sodium hydroxide and 900 g (49.8 moles) of water, and the contents were mixed with one another (in this time, the pH of an aqueous solution obtained by diluting a portion of this liquid mixture with water in an amount 100 times the weight of the mixture was higher than 11) to react them at 255° C. for 2 hours.

After the autoclave was then cooled, the contents were taken out of the autoclave to pour them into a great amount of water and neutralize with hydrochloric acid. The resulting product was thoroughly washed with water and separated by filtration as a wet cake. This wet cake was dried at 100° C. for 24 hours and then subjected to Soxhlet extraction making use of an acetone/benzene mixed solvent (volume ratio of 1/1). The resulting extract was then dried under reduced pressure at 30° C. for 24 hours, thereby obtaining a carboxylated arylene thioether oligomer [ATEO-(1)] as white powder.

In an infrared absorption spectrum (IR) on ATEO-(1), an absorption attributed to the carbonyl of carboxylic acid existed near 1690 cm$^{-1}$.

From the results of IR and elemental analysis, the structure of ATEO-(1) was judged to be as follows:

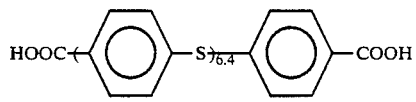

The number-average molecular weight, molecular weight distribution and melting point of ATEO-(1) were also found to be 520, 2.0 and 250° C., respectively.

EXAMPLE 2

Preparation of Carboxylated Arylene Thioether Oligomer

A titanium-lined autoclave was charged with 972 g (9.00 basal moles) of PATE-(1), 9600 g of NMP, 151 g (0.899 mole) of hydrated sodium sulfide (water content: 53.6 wt. %), 48.0 g (1.20 moles) of sodium hydroxide, 48.0 g (0.649 mole) of calcium hydroxide and 265 g (14.7 moles) of water. The contents were stirred at room temperature to obtain a liquid mixture. The pH of an aqueous solution obtained by diluting a portion of the liquid mixture with water in an amount 100 times the weight of the mixture was higher than 11.

The liquid mixture was treated in a similar manner to Example 1 to conduct depolymerization and alkali thiolate-forming reaction.

The amount of unreacted sodium sulfide remaining in the reaction mixture was zero.

The thus-obtained liquid reaction mixture (containing 0.90 mole of a sodium thiolate-containing oligomer) was added with 376 g (2.39 moles) of p-chlorobenzoic acid, 192 g (4.80 moles) of sodium hydroxide and 900 g (49.8 moles) of water, and the contents were mixed with one another (in this time, the pH of an aqueous solution obtained by diluting a portion of this liquid mixture with water in an amount 100 times the weight of the mixture was higher than 11), and treated in a similar manner to Example 1 to obtain a carboxylated arylene thioether oligomer [ATEO-(2)] as white powder.

In IR on ATEO-(2), an absorption attributed to the carbonyl of carboxylic acid was observed near 1690 cm$^{-1}$. From the results of IR and elemental analysis, the structure of ATEO-(2) was judged to be as follows:

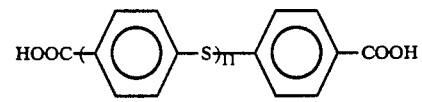

The number-average molecular weight, molecular weight distribution and melting point of ATEO-(2) were also found to be 790, 2.1 and 260° C., respectively.

EXAMPLE 3

Preparation of Carboxylated Arylene Thioether Oligomer

A titanium-lined autoclave was charged with 972 g (9.00 basal moles) of PATE-(1), 9600 g of NMP, 75.2 g (0.448 mole) of hydrated sodium sulfide (water content: 53.6 wt. %), 66.0 g (1.65 moles) of sodium hydroxide, 33.0 g (0.446 mole) of calcium hydroxide and 305 g (16.9 moles) of water. The contents were stirred at room temperature to obtain a liquid mixture. The pH of an aqueous solution obtained by diluting a portion of the liquid mixture with water in an amount 100 times the weight of the mixture was higher than 11.

The liquid mixture was treated in a similar manner to Example 1 to conduct depolymerization and alkali thiolate-forming reaction.

The amount of unreacted sodium sulfide remaining in the reaction mixture was zero.

The thus-obtained liquid reaction mixture (containing 0.45 mole of a sodium thiolate-containing oligomer) was added with 235 g (1.50 moles) of p-chlorobenzoic acid, 84 g (2.10 moles) of sodium hydroxide and 900 g (49.8 moles) of water, and the contents were mixed with one another (in this time, the pH of an aqueous solution obtained by diluting a portion of this liquid mixture with water in an amount 100 times the weight of the mixture was higher than 11), and treated in a similar manner to Example 1 to obtain a carboxylated arylene thioether oligomer [ATEO-(3)] as white powder.

In IR on ATEO-(3), an absorption attributed to the carbonyl of carboxylic acid was observed near 1690 cm$^{-1}$. From the results of IR and elemental analysis, the structure of ATEO-(3) was judged to be as follows:

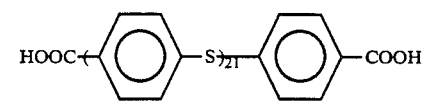

The number-average molecular weight, molecular weight distribution, melting point and melt viscosity of ATEO-(3) were also found to be 1760, 2.7, 277° C. and 20 poises (measured at 297° C.), respectively.

EXAMPLE 4

Production of Arylene Thioether Copolymer According to Production Process 1

An example in which ethylene glycol was used as an alkylenediol will be described.

A reactor was charged with 20.0 g (0.0153 mole) of ATEO-(2) obtained in Example 2, 2.09 g (0.0337 mole) of ethylene glycol and 0.010 g ($2.9 \times 10^{-5}$ mole) of tetra-n-butyl orthotitanate (hereinafter abbreviated as "TBT") as a catalyst. The contents were heated up to 200° C. over 2 hours while stirring them in a nitrogen stream and then further heated while reducing the pressure of the reaction system to react them for 0.25 hour at 300° C. and 360 mmHg. Thereafter, the contents were immediately cooled down to 280° C., and the degree of vacuum of the reaction system was gradually raised to 0.5 mmHg or lower, under which the contents were finally heated for 3.5 hours to react them, thereby obtaining an arylene thioether copolymer [ATEP-(1)] as a dark brown lump. Incidentally, liquid matter consisting of water formed in the course of the reaction and excess ethylene glycol was recovered in a substantially stoichiometric amount.

In IR on ATEP-(1) thus obtained, an absorption attributed to the carbonyl of ester was able to be observed near 1720 cm$^{-1}$ and shifted on the wave-number side higher than the absorption attributed to the carbonyl of carboxylic acid in ATEO-(2) used as a starting material at 1690 cm$^{-1}$. This indicates that ester linkages were introduced in the principal chain of ATEP-(1). An absorption attributed to phenylene sulfide was also observed at about 820 cm$^{-1}$. Physical properties of ATEP-(1) were as follows:

Glass transition temperature: 81° C.
Melting point: 261° C.
Melt viscosity: 1200 poises (measured at 281° C.)

EXAMPLE 5

Production of Arylene Thioether Copolymer According to Production Process 1

An example in which polyethylenediol was used as an alkylenediol will be described.

A reactor was charged with 30.0 g (0.0230 mole) of ATEO-(2) obtained in Example 2, 56.5 g (0.0230 mole) of polyethylenediol (POLYTAIL H, product of Mitsubishi Chemical Industries Limited; average molecular weight: 2,460) and 0.010 g ($2.9 \times 10^{-5}$ mole) of TBT as a catalyst. Reaction was conducted in the same manner as in Example 4 to obtain an arylene thioether copolymer [ATEP-(2)] as an ocher lump.

In IR on ATEP-(2) thus obtained, an absorption attributed to the carbonyl of ester was observed near 1720 cm$^{-1}$. Absorptions attributed to phenylene sulfide and methylene were also observed at about 820 cm$^{-1}$ and 3000–2900 cm$^{-1}$, respectively.

Physical properties of ATEP-(2) were as follows:
Melting Point: observed at both 45–65° C. and 265° C.
Melt viscosity: 3,200 poises (measured at 285° C.)

EXAMPLE 6

Production of Arylene Thioether Copolymer According to Production Process 1

An example in which polyethylenediol and ethylene glycol were used in combination as an alkylenediol component will be described.

A reactor was charged with 20.0 g (0.0153 mole) of ATEO-(2) obtained in Example 2, 18.8 g ($7.64 \times 10^{-3}$ mole) of the same polyethylenediol as that used in Example 5, 1.14 g (0.0184 mole) of ethylene glycol and 0.010 g ($2.9 \times 10^{-5}$ mole) of TBT as a catalyst. Reaction was conducted in the same manner as in Example 4 to obtain an arylene thioether copolymer [ATEP-(3)] as an ocher lump.

In IR on ATEP-(3) thus obtained, an absorption attributed to the carbonyl of ester was observed near 1720 cm$^{-1}$. Absorptions attributed to phenylene sulfide and methylene were also observed at about 820 cm$^{-1}$ and 3000–2900 cm$^{-1}$, respectively.

Physical properties of ATEP-(3) were as follows:
Melting point: observed at both 45°–65° C. and 260° C.
Melt viscosity: 4,500 poises (measured at 280° C.)

EXAMPLE 7

Production of Arylene Thioether Copolymer According to Production Process 2

An example in which a carboxylic acid component was reacted with a polyester, and ethylene glycol as an alkylenediol component will be described.

Preparation of Polyester

A reactor was charged with 15.0 g (0.0772 mole) of dimethyl terephthalate, 10.5 g (0.169 mole) of ethylene glycol, and 0.025 g ($1.4 \times 10^{-4}$ mole) of calcium acetate monohydrate and 0.010 g ($3.4 \times 10^{-5}$ mole) of antimony oxide as catalysts. The contents were stirred for 2 hours while gradually heating them up to 180°–200° C. in a nitrogen stream to remove methanol formed. After confirming that a substantially stoichiometric amount of methanol was removed, the contents were heated up to 220° C. to react them for about 1 hour. After an excess amount of ethylene glycol was removed, the contents were heated gradually up to 280° C. After reaching that temperature, the pressure of the reaction system was gradually reduced down to 0.5 mmHg or lower, under which the contents were finally reacted for 3 hours. Ethylene glycol distilled out in the course of this reaction was recovered in a substantially stoichiometric amount. After completion of the reaction, the temperature of the reaction mixture was lowered to 240° C., the pressure was returned to atmospheric pressure and at the same time, 15.0 g (0.130 mole) of ε-caprolactone was added to react the resulting mixture for 3 hours in a nitrogen stream, whereby a polyester was obtained as a white lump.

This polyester had a glass transition temperature of $-48$° C., a melting point of 172° C. and a melt viscosity of 7,200 poises (measured at 192° C.).

Production of Copolymer

A reactor was charged with 10.0 g of the polyester prepared in accordance with the above-described process, 10.0 g ($7.66 \times 10^{-3}$ mole) of ATEO-(2) obtained in Example 2, 0.60 g ($9.7 \times 10^{-3}$ mole) of ethylene glycol and 0.010 g ($2.9 \times 10^{-5}$ mole) of TBT as a catalyst. The contents were stirred for 2 hours while gradually heating them up to 180°-200° C. in a nitrogen stream and then further heated while gradually reducing the pressure of the reaction system to react them for 0.25 hour at 300° C. and 160 mmHg. Thereafter, the contents were immediately cooled down to 280° C., and the degree of vacuum of the reaction system was gradually raised to 0.5 mmHg or lower, under which the contents were finally heated for 3.5 hours to react them, thereby obtaining an arylene thioether copolymer [ATEP-(4)] as a dark brown lump. Liquid matter distilled out in the course of the reaction was removed out of the system.

In IR on ATEP-(4) thus obtained, an absorption attributed to the carbonyl of ester was able to be observed near 1720 cm$^{-1}$ and shifted on the wave-number side higher than the absorption attributed to the carbonyl of carboxylic acid n ATEO-(2) used as a starting material at 1690 cm$^{-1}$. This indicates that ester linkages were introduced in the principal chain of ATEP-(4). An absorption attributed to phenylene sulfide was also observed at about 820 cm$^{-1}$. Physical properties of ATEP-(4) were as follows:
Glass transition temperature: 8° C.
Melting point: 256° C.
Melt viscosity: 429 poises (measured at 276° C.)

EXAMPLE 8

Production of Arylene Thioether Copolymer According to Production Process 2

An example in which a carboxylic acid component was reacted with a polyester, and ethylene glycol as an alkylenediol component will be described.

Preparation of Polyester

A reactor was charged with 15.0 g (0.0903 mole) of terephthalic acid, 9.80 g (0.109 mole) of 1,4-butanediol and 0.010 g ($2.9 \times 10^{-5}$ mole) of TBT as a catalyst. The contents were stirred for 1.5 hours while gradually heating them up to 180°-200° C. in a nitrogen stream and reacted further at 220° C. for 2 hours. The pressure of the reaction system was then reduced while gradually heating it up to 250° C. After reaching that temperature, the degree of vacuum of the reaction system was raised further to 0.5 mmHg or lower, under which the contents were finally reacted for 3 hours. Water and excess 1,4-butanediol, which were distilled off in the course of this reaction, were nearly equal to a stoichiometric amount.

After the reaction, the pressure was returned to atmospheric pressure at 230° C. and at the same time, 15.0 g (0.13 mole) of ε-caprolactone was added to react the resulting mixture for 3 hours in a nitrogen stream, thereby obtaining a polyester as a white lump.

This polyester had a glass transition temperature of −51° C., a melting point of 132° C. and a melt viscosity of 5,400 poises (measured at 152° C.).

Production of Copolymer

A reactor was charged with 10.0 g of the polyester prepared in accordance with the above-described process, 10.0 g ($7.66 \times 10^{-3}$ mole) of ATEO-(2) obtained in Example 2, 0.60 g ($9.7 \times 10^{-3}$ mole) of ethylene glycol and 0.010 g ($2.9 \times 10^{-5}$ mole) of TBT as a catalyst. The contents were treated in the same manner as in Example 7 to obtain an arylene thioether copolymer [ATEP-(5)] as a dark brown lump.

In IR on ATEP-(5) thus obtained, absorptions attributed to the carbonyl of ester and phenylene sulfide were observed at 1720 cm$^{-1}$ and about 820 cm$^{-1}$, respectively.

Physical properties of ATEP-(5) were as follows:
Glass transition temperature: 6° C.
Melting point: 257° C.
Melt viscosity: 380 poises (measured at 277° C.)

EXAMPLE 9

Production of Arylene Thioether Copolymer According to Production Process 2

An example in which a carboxylic acid component was reacted with a polyester, and ethylene glycol as an alkylenediol component will be described.

A reactor was charged with 50.0 g of a polyester type thermoplastic elastomer (PERPRENE S-1001, product of Toyobo Co., Ltd.; glass transition temperature: −56° C.; melting point: 210° C.), 50.0 g (0.0583 mole) of ATEO- (1) obtained in Example 1, 3.20 g (0.0516 mole) of ethylene glycol and 0.050 g ($1.5 \times 10^{-4}$ mole) of TBT as a catalyst. The contents were treated in the same manner as the production process of the copolymer in Example 7 to obtain an arylene thioether copolymer [ATEP-(6)] as a dark brown lump.

In IR on ATEP-(6) thus obtained, an absorption attributed to the carbonyl of ester was able to be observed near 1720 cm$^{-1}$ and shifted on the wave-number side higher than the absorption attributed to the carbonyl of carboxylic acid in ATEO-(1) used as a starting material at 1690 cm$^{-1}$. This indicates that ester linkages were introduced in the principal chain of ATEP-(6). An absorption attributed to phenylene sulfide was also observed at about 820 cm$^{-1}$.

Physical properties of ATEP-(6) were as follows:
Glass transition temperature: 5° C.
Melting point: 224° C.
Melt viscosity: 630 poises (measured at 244° C.)

EXAMPLE 10

Production of Arylene Thioether Copolymer According to Production Process 2

An example in which a carboxylic acid component was reacted with a polyester, and ethylene glycol as an alkylenediol component will be described.

A reactor was charged with 150.0 g of the same polyester type thermoplastic elastomer as that used in Example 9, 150.0 g (0.115 mole) of ATEO-(2) obtained in Example 2, 8.94 g (0.144 mole) of ethylene glycol and 0.30 g ($8.8 \times 10^{-4}$ mole) of TBT as a catalyst. The contents were treated in the same manner as the production process of the copolymer in Example 7 except that the reaction mixture was finally heated for 4 hours at 0.5 mmHg or lower, thereby obtaining an arylene thioether copolymer [ATEP-(7)] as a dark brown lump.

In IR on ATEP-(7) thus obtained, absorptions attributed to the carbonyl of ester and phenylene sulfide were observed at 1720 cm$^{-1}$ and about 820 cm$^{-1}$ respectively.

Physical properties of ATEP-(7) were as follows:
Glass transition temperature: 7° C.
Melting point: 266° C.
Melt viscosity: 660 poises (measured at 286° C.)

EXAMPLE 11

Production of Arylene Thioether Copolymer According to Production Process 2

An example in which a carboxylic acid component was reacted with a polyester, and ethylene glycol as an alkylenediol component will be described.

A reactor was charged with 50.0 g of the same polyester type thermoplastic elastomer as that used in Example 9, 50.0 g (0.0205 mole) of ATEO-(3) obtained in Example 3, 3.00 g (0.0484 mole) of ethylene glycol and 0.050 g ($1.5 \times 10^{-4}$ mole) of TBT as a catalyst. The contents were treated in the same manner as in Example 9, thereby obtaining an arylene thioether copolymer [ATEP-(8)] as a dark brown lump.

The results of IR on ATEP-(8) thus obtained were the same as those in Example 10.

Physical properties of ATEP-(8) were as follows:
Glass transition temperature: 38° C.
Melting point: 274° C.
Melt viscosity: 720 poises (measured at 294° C.)

EXAMPLE 12

Production of Arylene Thioether Copolymer According to Production Process 2

An example in which a carboxylic acid component was reacted with a polyester, and ethylene glycol as an alkylenediol component will be described.

An arylene thioether copolymer [ATEP-(9)] was obtained as a dark brown lump in the same manner as in Example 10 except that the charged amounts of the polyester type thermoplastic elastomer and ATEO-(2) in Example 10 were changed to 75.0 g and 225 g, respectively.

The results of IR on ATEP-(9) thus obtained were the same as those in Example 10.

Physical properties of ATEP-(9) were as follows:
Glass transition temperature: 43° C.
Melting point: 258° C.
Melt viscosity: 510 poises (measured at 278° C.)

EXAMPLE 13

Production of Arylene Thioether Copolymer According to Production Process 2

An example in which a carboxylic acid component was reacted with a polyester, and ethylene glycol as an alkylenediol component will be described.

Preparation of Polyester

A reactor was charged with 80.0 g (0.0399 mole) of poly(tetramethylene oxide) glycol (PTG2000, product of Hodogaya Chemical Co., Ltd.; average molecular weight: 2,004), 31.0 g (0.160 mole) of dimethyl terephthalate, 24.0 g (0.387 mole) of ethylene glycol and 0.050 g ($1.5 \times 10^{-4}$ mole) of TBT as a catalyst. The contents were gradually heated up to 280° C. over 2 hours while stirring them in a nitrogen stream. Methanol and excess ethylene glycol were distilled out in the course of this heating. After reaching 280° C., the pressure of the reaction system was gradually reduced to 0.1 mmHg or lower over 1 hour. In this condition, the contents were reacted for 1.5 hours.

A polyester was obtained as a white lump. This polyester had a glass transition temperature of −47° C., melting points of 10° C. and 188° C., and a melt viscosity of 12,000 poises (measured at 208° C.).

Production of Copolymer

A reactor was charged with 50.0 g of the polyester prepared in accordance with the above-described process, 50.0 g (0.0383 mole) of ATEO-(2) obtained in Example 2, 3.00 g (0.0484 mole) of ethylene glycol and 0.10 g ($2.9 \times 10^{-4}$ mole) of TBT as a catalyst. The contents were treated in the same manner as in Example 9 to obtain an arylene thioether copolymer [ATEP-(10)] as a dark brown lump.

In IR on ATEP-(10) thus obtained, an absorption attributed to the carbonyl of ester was able to be observed near 1720 cm$^{-1}$ and shifted on the wave-number side higher than the absorption attributed to the carbonyl of carboxylic acid in ATEO-(2) used as a starting material at 1690 cm$^{-1}$. An absorption attributed to phenylene sulfide was also observed at about 820 cm$^{-1}$.

Physical properties of ATEP-(10) were as follows:
Glass transition temperature: −45° C.
Melting point: 16° C. and 257° C.
Melt viscosity: 720 poises (measured at 277° C.

EXAMPLE 14

Production of Arylene Thioether Copolymer According to Production Process 2

An example in which a carboxylic acid component was reacted with a polyester, and ethylene glycol as an alkylenediol component will be described.

A reactor was charged with 20.0 g of a polyester type thermoplastic elastomer (PERPRENE P-70, product of Toyobo Co., Ltd.; melting point: 193° C.) , 20.0 g (0.0153 mole) of ATEO-(2) obtained in Example 2, 12.0 g (0.194 mole) of ethylene glycol and 0.030 g ($8.8 \times 10^{-5}$ mole) of TBT as a catalyst. The contents were treated in the same manner as in Example 9 to obtain an arylene thioether copolymer [ATEP-(11)] as a dark brown lump.

In IR on ATEP-(11) thus obtained, an absorption attributed to the carbonyl of ester was able to be observed near 1720 cm$^{-1}$ and shifted on the wave-number side higher than the absorption attributed to the carbonyl of carboxylic acid in ATEO-(2) used as a starting material at 1690 cm$^{-1}$. An absorption attributed to phenylene sulfide was also observed at about 820 cm$^{-1}$.

Physical properties of ATEP-(11) were as follows:
Glass transition temperature: 5° C.
Melting point: 257° C.
Melt viscosity: 510 poises (measured at 277° C.)

EXAMPLE 15

Production of Arylene Thioether Copolymer According to Production Process 3

An example in which a carboxylic acid component was reacted with a lactone, and ethylene glycol as an alkylenediol component will be described.

Preparation of Prepolymer

ATEP-(1) obtained in Example 4 was used as a prepolymer.

Production of Copolymer

In a nitrogen stream, 20.0 g (0.173 mole) of ε-caprolactone was added to 20.0 g of the prepolymer to react them for 2 hours. Thereafter, the pressure of the reaction system was gradually reduced to 0.5 mmHg or lower, under which the contents were reacted for 1.5 hours, thereby obtaining an arylene thioether copolymer [ATEP-(12)] as a dark brown lump.

In IR on ATEP-(12) thus obtained, absorptions attributed to the carbonyl of ester and phenylene sulfide were observed at 1720 cm$^{-1}$ and about 820 cm$^{-1}$, respectively.

Physical properties of ATEP-(12) were as follows:
Glass transition temperature: 59° C.
Melting point: 265° C.
Melt viscosity: 1,050 poises (measured at 285° C.)

COMPARATIVE EXAMPLE 1

In order to prepare a carboxylated oligomer similar to that obtained in Example 1, polymerization and carboxylation were performed at the same time in the following manner. A titanium-lined autoclave was charged with 9600 g of NMP, hydrated sodium sulfide (water content: 53.6 wt. %) with the amount changed from 302 g in Example 1 to 840 g (5.00 moles), 735 g (5.00 moles) of p-dichlorobenzene in place of 972 g of PATE-(1), 314 g (2.00 moles) of p-chlorobenzoic acid, sodium hydroxide with the amount changed from 37.2 g in Example 1 to 84.2 g (2.10 moles) and water with the amount changed from 184 g in Example 1 to 68.0 g (3.78 moles). The reaction conditions in Example 1 were followed except that the heating was conducted at 220° C. for 10 hours.

Thereafter, 346 g (19.2 moles) of water was added in accordance with the carboxylation reaction described in Example 1 to react the contents at 255° C. for 2 hours.

An after-treatment was further carried out in the same manner as in Example 1 to obtain a polymer as white powder.

IR on this polymer was exactly the same as that on PATE-(1) obtained in Referential Example 1. No absorption attributed to the carbonyl of carboxylic acid was observed.

COMPARATIVE EXAMPLE 2

Production of Arylene Thioether Copolymer According to Production Process 2

A polymer was obtained in the same manner as in Example 10 except that the reaction was conducted without adding ethylene glycol.

This polymer had two melting points of 266° C. and 163° C. and its melt viscosity was as extremely low as 30 poises (measured at 286° C.).

We claim:

1. A process for the production of an arylene thioether copolymer, which comprises forming a carboxylated arylene thioether oligomer by
   (1) first causing an alkali metal sulfide to act on a poly(arylene thioether) having recurring units represented by the general formula (I):

$$-\!\!+\!\!Ar\!-\!\!S\!+\!\!- \qquad (I)$$

wherein Ar is an arylene group, in a water-containing polar organic solvent to depolymerize the poly(arylene thioether), thereby preparing an oligomer having at least one alkali thiolate group; and
   (2) second causing a carboxylating agent represented by the general formula (II):

$$X-Ar'-\underset{\underset{O}{\|}}{C}-O-R_1 \qquad (II)$$

wherein X is a halogen atom, $R_1$ denotes a hydrogen atom, an alkyl group having 1-4 carbon atoms, an aryl group or an alkali metal atom, and Ar' is an arylene group, to act on the alkali thiolate-containing oligomer obtained in the first step, thereby forming the carboxylated arylene thioether oligomer; and reacting (A) a carboxylic acid component consisting of the carboxylated arylene thioether oligomer alone, or a mixture of the carboxylated oligomer in an amount of at least 50 wt. % and another carboxylic compound in an amount less than 50 wt. % with (B) an alkylenediol and (D) a lactone.

2. The process as claimed in claim 1, which comprises reacting the carboxylic acid component with the alkylenediol to obtain a prepolymer and then reacting the prepolymer and the lactone with each other at a weight ratio of 20:80–80:20 at 100°–350° C. for 0.2–50 hours.

3. The process as claimed in claim 1, wherein the alkylenediol is a lower alkylenediol having an average molecular weight of 60–200.

4. The process as claimed in claim 1, wherein the lactone is β-butyrolactone, δ-valerolactone, δ-caprolactone, ε-caprolactone or a mixture thereof.

5. The process as claimed in claim 1, wherein the reaction of the prepolymer with the lactone is conducted in the presence of a polymerization catalyst for lactones.

* * * * *